(12) United States Patent
Koivupuro et al.

(10) Patent No.: US 7,027,814 B1
(45) Date of Patent: Apr. 11, 2006

(54) IMPLEMENTING SIMULTANEOUS CALLS IN A TELECOMMUNICATIONS NETWORK

(75) Inventors: Outi Koivupuro, Helsinki (FI); Timo Kauhanen, Espoo (FI); Pekka Ruuska, Oulu (FI)

(73) Assignee: Nokia Networks Oy, Espoo (FI)

( * ) Notice: Subject to any disclaimer, the term of this patent is extended or adjusted under 35 U.S.C. 154(b) by 0 days.

(21) Appl. No.: 09/787,286

(22) PCT Filed: Jun. 21, 1999

(86) PCT No.: PCT/FI99/00545

§ 371 (c)(1),
(2), (4) Date: May 3, 2001

(87) PCT Pub. No.: WO00/16576

PCT Pub. Date: Mar. 23, 2000

(30) Foreign Application Priority Data

Sep. 15, 1998 (FI) ..................... 981989

(51) Int. Cl.
*H04Q 7/20* (2006.01)

(52) U.S. Cl. ..................... 455/435; 455/445; 455/456; 455/560

(58) Field of Classification Search ............. 455/435, 455/445, 456, 560; 9/551, 558; 329/91.9, 329/59, 33.1
See application file for complete search history.

(56) References Cited

U.S. PATENT DOCUMENTS

| 5,438,612 | A | * | 8/1995 | Norimatsu | 455/565 |
|---|---|---|---|---|---|
| 5,579,375 | A | * | 11/1996 | Ginter | 455/417 |
| 5,754,638 | A | | 5/1998 | Kusunoki | 379/212 |
| 5,838,665 | A | | 11/1998 | Kahn et al. | 370/260 |
| 5,926,755 | A | * | 7/1999 | Ghisler | 455/509 |
| 6,188,899 | B1 | * | 2/2001 | Chatterjee et al. | 455/435.1 |
| 6,324,405 | B1 | * | 11/2001 | Young et al. | 455/456.1 |
| 6,484,027 | B1 | * | 11/2002 | Mauney et al. | 455/421 |

FOREIGN PATENT DOCUMENTS

| EP | 0 357 427 A2 | 3/1990 |
|---|---|---|
| EP | 0 458 523 A2 | 11/1991 |
| JP | 6-276211 | 9/1994 |
| JP | 08321882 A | 12/1996 |
| WO | WO 98/17050 | 4/1998 |
| WO | WO 98/20693 | 5/1998 |

* cited by examiner

*Primary Examiner*—Emmanuel L. Moise
*Assistant Examiner*—Julio Perez
(74) *Attorney, Agent, or Firm*—Pillsbury Winthrop Shaw Pittman, LLP

(57) ABSTRACT

A method for managing multiple, independent, simultaneous calls between a mobile communications network and a subscriber terminal. For each subscriber terminal there is a first upper limit which is related to the capacity of its radio interface. Calls are limited to a number which does not result in exceeding the first upper limit. There is also, for the number of simultaneous calls, at least one second upper limit which is not lower than zero. The actual number of simultaneous calls between the network and the subscriber terminal is monitored. A new call to/from the subscriber terminal is allowed only if the actual number of simultaneous calls is less than the at least one second upper limit. Preferably, there is a separate second upper limit for each subscriber and for each of several call types, such as voice, data and fax calls.

11 Claims, 3 Drawing Sheets

IMPLEMENTING SIMULTANEOUS CALLS IN A TELECOMMUNICATIONS NETWORK

BACKGROUND OF THE INVENTION

The invention relates to methods and equipment for implementing multiple calls in a telecommunications network. The invention will be described in connection with mobile telecommunications networks, especially so-called third generation (3G) mobile communications systems. However, the invention is also applicable in wired networks. 3G mobile systems, such as UMTS (Universal Mobile Telecommunications System), are being standardised by the UMTS Forum and the European Telecommunication Standard Institute (ETSI). The current state of UMTS is defined in references 1 to 4. It has been suggested that future 3G systems permit multiple simultaneous calls to/from a single mobile station. In other words, mobile stations will have multiple independently-controlled traffic channels.

A problem with the prior publications related to 3G systems is that handling of multiple calls is only specified on a "should-be possible" level. In other words, the prior publications almost completely ignore the management details of multiple calls to/from a single mobile station. In a second generation (2G) system, such as GSM, there is one situation where a mobile station may have two calls. Such a situation may arise if the subscriber has a supplementary service (SS) called Call Hold (CH). However, a 2G mobile station does not have multiple independently-controlled traffic channels, and in a CH situation, only one call can be active and the other one is put on hold. Even in so-called high-speed data transfer, a mobile station uses several time slots but all the time slots are assigned to a common traffic channel.

DISCLOSURE OF THE INVENTION

For convenience, the term 'multicall' will be used to describe multiple, independent, simultaneous calls to/from a single mobile station using multiple independently-controlled traffic channels. Some of the calls can be mobile-originated (MO) calls and some can be mobile-terminated (MT) calls. An object of the invention is to provide mechanisms for supporting such multicalls. The user of the mobile station should be able to receive incoming calls independently of outgoing calls and place new outgoing calls independently of incoming calls. To a certain extent, these requirements interfere or conflict with certain well-established procedures for supplementary services in existing systems. It is another object of the invention to resolve such conflicts and keep them to a minimum.

The invention is based on novel criteria for allowing incoming and outgoing calls in a telecommunications network to which a subscriber terminal is connected via a transmission path having a finite transfer capacity, such as a radio interface. According to a first aspect of the invention, there is provided a method for managing multiple, independent, simultaneous calls between a telecommunications network and a subscriber terminal. A prior art method comprises the step of allowing a new call only if allowing it does not result in exceeding a first upper limit, which is related to the available capacity of the transmission path.

The first upper limit could also be called 'a physical upper limit' or 'an available upper limit'. In 2G systems, the step of allowing a new call only within the available capacity of the transmission path is almost trivial because the capacity of the radio interface is one call. In 3G systems, the Radio Network Controller (RNC) has typically an Admission Control function allocating a certain amount of data rate for each simultaneous call until the maximum data rate of the radio interface is reached. Alternatively, if the network is loaded, the Admission Control function may allocate a smaller data rate than requested. Thus, the first upper limit is at most equal to the physical data rate of the radio interface, but the Admission Control may limit it to a lower value. The method according to the first aspect of the invention is characterized by the steps of:

defining, for the number of the simultaneous calls, at least one second upper limit, which is not lower than zero;

monitoring the actual number of simultaneous calls between the network and the mobile station; and allowing a new incoming or outgoing call only if the actual number of simultaneous calls is less than the second upper limit.

According to another aspect of the invention, there is provided a network element having call control (CC) functionality, such as a Mobile services Switching Centre (MSC), for implementing the method described above.

According to yet another aspect of the invention, there is provided a subscriber register, preferably a Home Location Register (HLR) or a Visitor Location Register (VLR), for storing sets of subscriber data, wherein each set of subscriber data is associated with a specific mobile station, and comprises, or is associated with, a corresponding data structure for storing at least one upper limit for the number of simultaneous calls to/from the mobile station in question.

According to yet another aspect of the invention, there is provided a subscriber terminal, such as a mobile station, having a specially adapted user interface for setting at least one upper limit for the number of simultaneous calls, wherein the subscriber terminal is adapted to transmit the upper limit(s) to the telecommunications network.

According to a preferred embodiment of the invention, calls are classified into a plurality of call types, such as a voice call, a data call and a fax call. For each type, there is preferably a separate upper limit. For example, multimedia services can be implemented as multicalls, wherein each call controls one data stream. In a multimedia session, there can be one data stream for each of audio, video and data. (The data stream for video may be transferred in a data call, or there may be a separate call type for video.) Gathering and synchronising such simultaneous calls is not performed in the core network. The core network does not have to recognise any relationship between the calls related to a common session. Instead, synchronising such simultaneous calls is the task of the user or the application-level software being executed in the mobile station, or in a computer connected to it, or in an application server operationally connected to the cellular network.

There could be an optional check to verify that the at least one second upper limit (NMAX) is selected so that allowing this number of simultaneous calls does not result in exceeding the first upper limit. However, this is not strictly necessary, considering that the call control functionality performs this step anyway, by allocating the data rate within the limits of the radio interface. According to a current vision, a 3G mobile station could, in terms of data rate, support dozens of simultaneous calls. This far exceeds the user's capability to organise such calls, and thus, in practice, the second upper limit is generally set to such a low number that the maximum data rate of the radio interface will not be reached.

Initially, the current upper limit(s) can be defined in the subscription contract. Preferably, the one or more upper limits are stored in the HLR together with conventional subscriber data. They are also transferred to the MSC/VLR serving the mobile station together with conventional subscriber data. The MSC/VLR serving the mobile station monitors the actual number of simultaneous calls, compares the actual number of calls with the upper limit for calls and allows a new call only if the actual number is less than the upper limit. As stated, the storage, transfer, comparison, etc. are performed individually for each call type.

According to another preferred embodiment of the invention, the user is allowed to modify the current upper limit(s) of simultaneous calls. As a rather crude mechanism for implementing this, the user could send a suitably formulated connectionless message, such as a Short Message or USSD (Unstructured Supplementary Service Data) message. As a more user-friendly solution, the user may have access to his/her configuration options by means of a browser which may reside in an advanced mobile station, in a portable computer connected to it, or in a separate computer.

According to yet another embodiment of the invention, two supplementary services known from GSM-type networks will be replaced with more advanced (configurable) versions. These supplementary services are BAIC (=BArring of Incoming Calls) and BAOC (=BArring of Outgoing Calls) which will be replaced with BMIC(N1) (=BArring of Multiple Incoming Calls) and BMOC(N2) (=BArring of Multiple Outgoing Calls) respectively. The parameters N1 and N2 indicate the maximum number of allowed simultaneous incoming or outgoing calls. If N1=N2=0, BMIC(N) and BMOC(N) are equivalent to BAIC and BAOC respectively. If N1=N2=1, the mobile station acts like a 2G mobile station, i.e. only single calls are allowed but multicalls are not.

Obviously, it is not necessary to delete the supplementary services BAIC and BAOC. They can be used in parallel with the more advanced versions of these services. As an alternative, the parameters N1 and N2 could be made optional and appended to the names of the services BAIC and BAOC. In other words, BAIC(N1) and BAOC(N2) limit the number of simultaneous calls to N1 and N2 respectively. If N1 or N2 is omitted, it defaults to zero, which is equivalent to the GSM-type implementation of BAIC and BAOC.

Preferably, the parameters N1 and N2 have two distinct upper limits and a user-configurable current value. The network operator may charge a premium for the ability to handle multicalls. For subscribers not willing to pay this premium, N1 and N2 have an upper limit of one, i.e. multicalls are not allowed. Even if multicalls are allowed, their number may still be limited to some reasonable value. On the other hand, a company which pays the invoice may also wish to limit N1 and N2 to one for most users, and only allow multicalls for a few users who absolutely need this ability. The user is allowed to set the current values of N1 and N2 between zero and the lower of these upper limits.

The physical upper limit can be stored in the Equipment Identity Register (EIR). When the current upper limits are changed (at least when they are increased), the EIR can be consulted to ensure that the new values are within the physical upper limit. Alternatively, the MS's physical upper limit may be stored in the HLR, or it can be known only by the MS itself, whereby the MS and the RNC negotiate a mutually agreed value. According to current plans for UMTS, the physical upper limit is not a fixed number of calls, but a maximum data rate or bandwidth. The one or more current upper limits should be specified so that the sum of the characteristic data rates for the individual simultaneous calls does not exceed the maximum data rate of the mobile station. Although the physical upper limit is preferably expressed in terms of data rate (megabits per second), the current upper limit is preferably expressed as a maximum number of calls of each type, because the limit is mainly related to the user's ability to organise individual calls. Most probably, the upper limit of simultaneous voice calls is set to one, but it makes sense to limit also the number of simultaneous data and fax calls to a reasonable number. In terms of data rate, a UMTS terminal could support dozens of simultaneous data calls, but if each data call requires the user's attention at some point of the call, the user will be overwhelmed. The characteristic data rate for each data call can be determined e.g. by means of the negotiated Quality of Service (QoS) for the call in question.

According to other preferred embodiments of the invention, the criteria for detecting certain busy conditions in the network and certain supplementary services using such criteria are modified.

BRIEF DESCRIPTION OF THE DRAWINGS

The invention will be described in more detail by means of preferred embodiments with reference to the appended drawing wherein.

DETAILED DESCRIPTION OF THE INVENTION

For convenience, certain shorthand notations will be used in the description. '3G system' refers to a system having multicall capability, such as UMTS. Correspondingly, '2G system' refers to a system lacking multicall capability, such as GSM. '3G mode' refers to the operation of a 3G system when multicalls are allowed, and '2G mode' refers to the operation when multicalls are not allowed.

Figure 1:
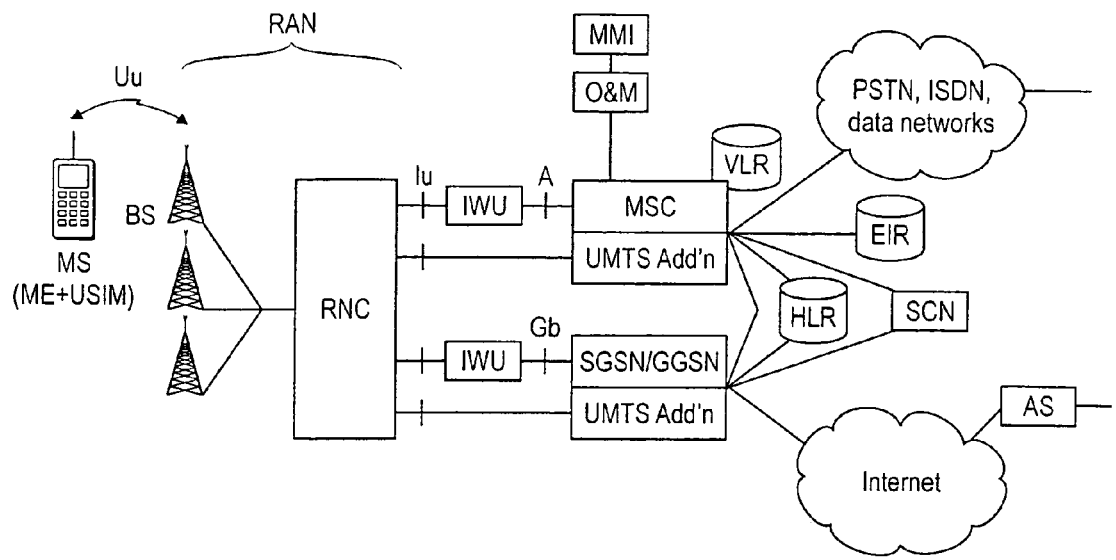
FIG. 1 is a block diagram of a third generation mobile communications network (UMTS)

FIG. 1 is a block diagram of a third generation mobile communications network, such as UMTS. It should be understood that no 3G systems have been fully standardised. Therefore, all terms and expressions are used by way of example, and they should be interpreted as terms of description, not of limitation.

A UMTS Mobile Station (MS) consists of Mobile Equipment (ME) and a USIM card (User and Services and Identity Module). There is a radio interface (Uu) between the MS and a Radio Access Network (RAN), which comprises Base Stations (BS) under the control of Radio Network Controllers (RNC). For circuit-switched services, the RNCs are connected, via an A interface, to Mobile services Switching Centres (MSC), and for packet-switched services, there is a connection, via a Gb interface, to Serving GPRS Support Nodes (SGSN). The MSC and SGSN elements may include separate UMTS addition sections. Subscriber data related to the MS is stored permanently in a Home Location Register (HLR) and for circuit-switched operation, the data is transferred to the Visitor Location Register (VLR) of the MSC which currently serves the MS. There may be separate Interworking Units (IWU) for adapting the A and Gb interfaces of GSM/GPRS systems to the Iu interface of UMTS. For storing equipment-related data, the network comprises an Equipment Identity Register (EIR). For entering and updating subscriber-specific data, there is an Operation and Maintenance (O&M) section having a Man-Machine Interface (MMI). For creating and managing supplementary services, there is typically a dedicated Service Control Node (SCN) which can be seen as an evolved version of a Service Control Point (SCP) of Intelligent Networks.

When a new subscriber contract is signed, the subscriber data is stored in the HLR. The subscriber data also includes the current upper limits for each call type (voice, data, fax, etc.). The mobile station's specifications, including the physical upper limit, can be stored in the EIR, the HLR, or in the MS itself. The user of the MS can change the current upper limits for each call type by sending a suitably formulated short message or USSD message or, preferably, by accessing an application server AS via the Internet, either with the mobile station or with a separate computer (not shown) connected to the Internet.

Figure 2A:
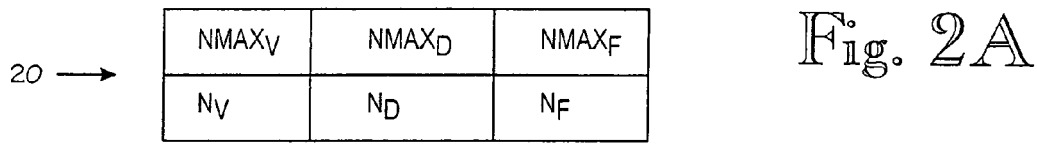
FIG. 2A depicts a data structure within the MSC/VLR for monitoring the number of current calls.

FIG. 2A depicts a data structure 20 within the MSC/VLR for monitoring the number of current calls. According to a preferred embodiment of the invention, the data structure 20 comprises individual upper limits ($NMAX_V$, $NMAX_D$, $NMAX_F$) and individual current numbers of simultaneous calls ($N_V$, $N_D$, $N_F$) for voice, data and fax calls, respectively. The maximum numbers are stored initially in the HLR, from which they are transferred to the MSC/VLR serving the MS. During an inter-MSC handover, the data structure 20 must be transferred to the new MSC/VLR.

Figure 2B:
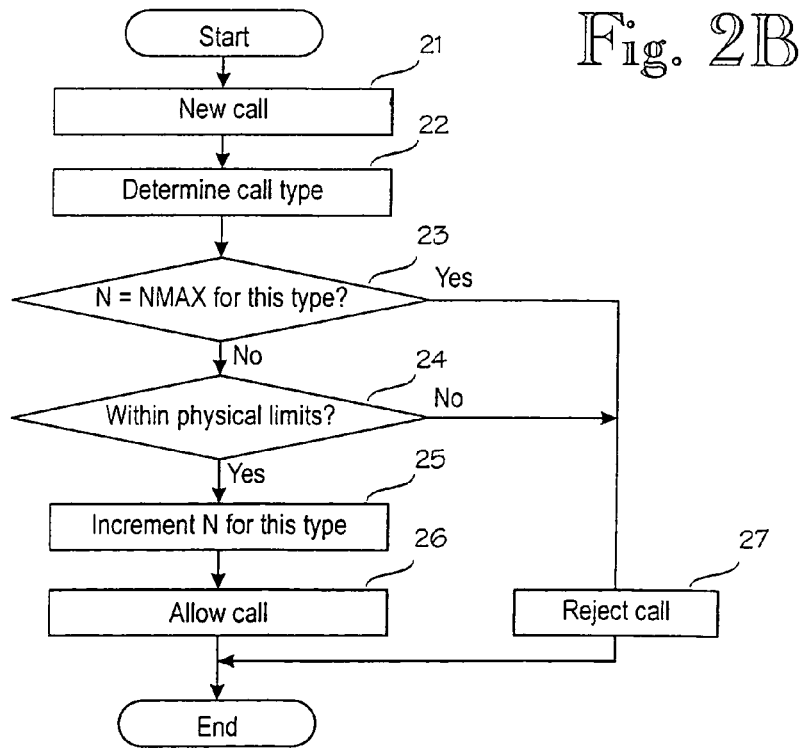
FIG. 2B is a flow chart illustrating a test for allowing new calls.

FIG. 2B is a flow chart illustrating a test for allowing or rejecting new calls. FIG. 2B relates to the preferred embodiment of the invention having individual upper limits for each call type (voice, data, fax, etc.) In step 21, a request for a new call is detected. In step 22, the call type is determined (voice, data or fax). In step 23, the current number N for this call type is compared with the current upper limit NMAX of the same call type. If N=NMAX for this call type (i.e. the upper limit has already been reached), the call will be rejected in step 27. Step 24 corresponds to the prior art test, wherein it is tested whether or not a new call would exceed the physical or available capacity of the transmission path, such as the radio interface. If so, the call will be rejected in step 27. Otherwise, in step 25, the number N of this call type will be incremented by one and, in step 26, the call will be allowed. Naturally, when a call is released, the number N of this call type will be decremented by one, although this is not explicitly shown in FIG. 2B.

Modifications to Busy Conditions

There are two kinds of busy conditions, network-determined user busy (NDUB) and a user-determined user busy (UDUB). In 2G systems, the NDUB condition is detected if the mobile station's one and only traffic channel is busy. According to the invention, the NDUB condition is not necessarily detected if one traffic channel of the MS is allocated. Neither is it sufficient to test if all traffic channels of the MS are allocated. According to the invention, the NDUB condition is detected if the actual number of simultaneous calls equals the current upper limit. Preferably, the NDUB detection is performed individually for several types of calls (voice, data, fax, etc.)

The network-determined user busy (NDUB) condition is also detected if the user has indicated an UDUB condition. In this case, the network maintains the NDUB condition until the user cancels the UDUB. The user can use this feature to indicate that he/she does not want to receive any new calls.

Figure 3A:
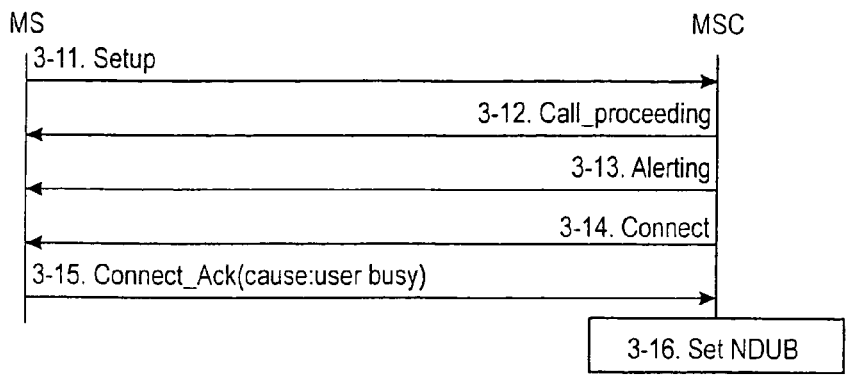
FIGS. 3A to 3D are signalling diagrams illustrating handling of user-detected busy conditions.

As shown in FIG. 3A, in a mobile-originated (MO) call establishment procedure, the user's choice may be indicated to the network as follows. In step 3-11, the MS sends a SETUP message to the MSC. In step 3-12, the MSC replies with a CALL_PROCEEDING message to the MS. In step 3-13, the MSC sends an ALERTING message to the MS. In step 3-14, the MSC sends a CONNECT message to the MS. In step 3-15, the MS replies with a CONNECT_ACK message with a cause code "user busy". In response to the "user busy", in step 3-16, the MSC registers NDUB condition for this MS.

Figure 3B:
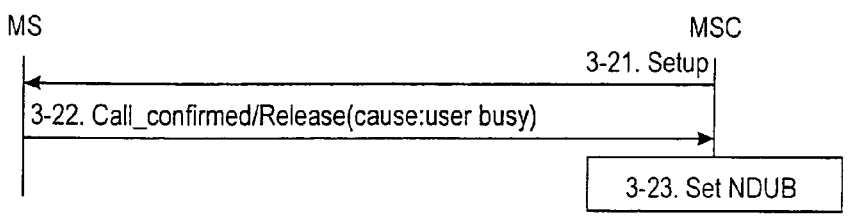

FIG. 3B shows how, in a mobile-terminated (MT) call establishment procedure, the MS user's choice may be indicated to the network. In step 3-21, the MSC sends a SETUP message to the MS. In step 3-22, if the user accepts the call, the MS sends a CALL_CONFIRMED message with a cause code "user busy". If the user rejects the call, the MS sends a RELEASE message with a cause code "user busy". In response to the "user busy". In step 3-23, the MSC registers NDUB condition for this MS.

Figure 3C:
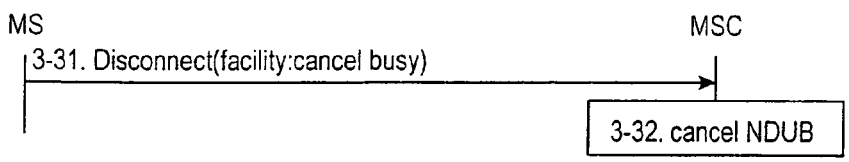

FIG. 3C shows how the MS user may signal cancelling the UDUB condition in an MS-initiated call release procedure. In step 3-31, the MS sends to the MSC a DISCONNECT message with a facility information element "cancel busy". In response to the DISCONNECT message cancelling the UDUB condition, in step 3-32, the MSC cancels the NDUB condition for this MS.

Figure 3D:
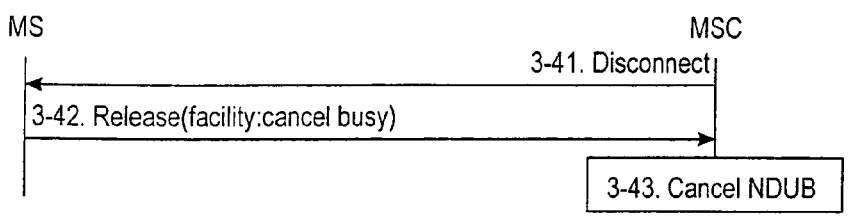

FIG. 3D shows a network initiated call release procedure. In step 3-41, the MSC sends a DISCONNECT message to the MS. In step 3-42, the MS sends to the MSC a RELEASE message with a facility information element to "cancel busy". In response to the RELEASE message cancelling the UDUB condition, in step 3-43, the MSC cancels the NDUB condition for this MS.

Modifications to other supplementary services (SS)

The following supplementary services are triggered by a 'user busy' condition, and their behaviour should be modified accordingly: CW (Call Waiting), CFB (Call Forwarding on Busy) and CCBS (Completion of Calls to Busy Subscribers). In addition, the following supplementary services involve elements which may interact with multicall operations: MPTY (Multiparty call), CH (Call Hold) and ECT (Explicit Call Transfer). In the following, modifications to these supplementary services will be described in more detail.

For the CW (Call Waiting) SS, the setup signalling does not necessarily differ from prior art setup signalling. According to current specifications, the Signal parameter indicates that a special alerting tone (Call Waiting) should be given. It is not strictly necessary to convey this information in the Signal parameter, since the MS can detect this condition itself. If the user is busy, there is no difference in a CW situation between 2G and 3G systems. There is a difference, however, if the MS user chooses 2G mode but does not have CW activated. If the MS is busy, the incoming call will not be offered, whereas in the 3G mode the incoming call will be offered as an independent call. This problem can be solved by (temporarily) setting the upper limit of simultaneous calls to 1. Now, if the MS is busy and the CW is not activated, incoming calls will be barred, like in a 2G system.

CH (Call Hold) exists in 2G systems because multiple calls must share a single traffic channel. In CH operation, one call is active and the other one is put on hold. It would appear that CH is a redundant function in a 3G system.

However, a corresponding function is nevertheless useful for muting those calls which the user cannot handle at the moment.

Similarly, MPTY (Multiparty call) might be seen as a redundant SS in a 3G system because the speech paths of the multiple calls could be combined in the mobile station. Nevertheless, it is preferable to implement MPTY as a separate supplementary service, because combining the speech paths in the network (instead of the MS) and offering the combined speech path to the MS saves air interface resources and the MS's battery.

The CFB (Call Forwarding on Busy) supplementary service enables a served user to have the network redirect to another user calls which are addressed to the served user's ISDN number and which encounter a busy condition, i.e. either a network determined user busy (NDUB) or a user determined user busy (UDUB).

Figure 4:
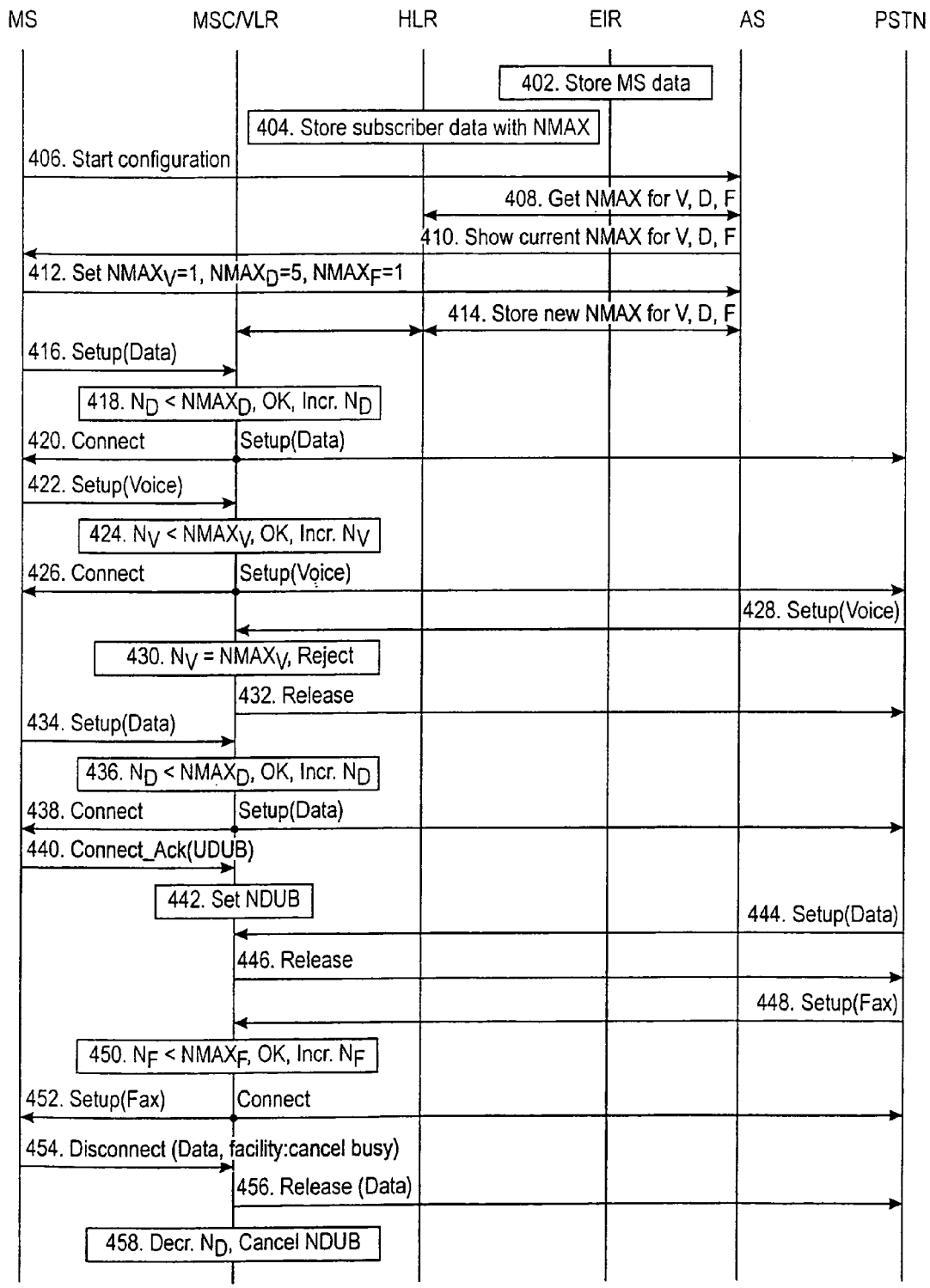
FIG. 4 is a signalling diagram illustrating a hypothetical scenario related to the invention.

FIG. 4 is a signalling diagram illustrating a hypothetical scenario related to the invention. It should be understood that for clarity, the signalling diagram is very much simplified, and routine tasks, such as resource reservations and the like, are omitted. In step 402, the MS's specifications, including the physical upper limit, are stored in the EIR. In step 404, the subscriber data, including the current upper limits NMAX for the different call types, are stored in the HLR. In step 406, the MS user accesses the application server AS for setting the current upper limits NMAX for the simultaneous calls. In step 408, the AS retrieves the upper limits from the HLR. In step 410, the AS shows the current upper limits to the MS user. In step 412, the MS user sets the new upper limits as follows: number of voice calls $NMAX_V=1$, number of data calls $NMAX_D=5$, number of fax calls $NMAX_F=1$. Because the number of simultaneous voice calls is limited to 1, in this respect, the MS acts like a 2G device. However, it is capable of handling multiple data calls and, in this example, one fax call while it is involved in a voice call. In step 414, the AS sends the modified upper limits to the HLR which sends them to the MSC/VLR. (Optionally, either the AS or the HLR could consult the EIR for checking that the new limits are reasonable, considering the capabilities of the hardware.) In step 416, the MS initiates a data call by sending a SETUP message. In steps 418 to 420, the MSC compares the number of current data calls ($N_D=0$) with the maximum number of current data calls ($NMAX_D=5$) and allows the call by sending a CONNECT message to the MS and a SETUP message to the PSTN. The MSC increments the current number of data calls $N_D$ to 1.

As an alternative to steps 406 to 414 shown in FIG. 4, the MS-user could send the network a suitably formulated short message or USSD message, an example of which will be shown later in connection with FIG. 5.

In step 422, the ongoing data call does not fully consume the user's attention, and the user initiates a voice call. In steps 424 to 426, the MSC compares the number of current voice calls ($N_V=0$) with the maximum number of voice calls ($NMAX_V=1$) and allows the call by sending a CONNECT message to the MS. The MSC increments the number of current voice calls $N_V$ to 1.

In step 428, another subscriber tries to place a mobile-terminated (MT) voice call to the MS. In step 430, the MSC compares the number of current voice calls ($N_V=1$) with the maximum number of voice calls ($NMAX_V=1$) and, in step 432, rejects the MT call by sending a RELEASE message to the PSTN. If the MS subscriber has e.g. a CFB supplementary service, it would be triggered at this point (the call would be redirected to an alternative number, such as voice mail).

In step 434, let us assume that the conversation in the ongoing voice call requires the user to place another data call, presumably for inquiring about a specific piece of information. Because the user will have two ongoing data calls in addition to the voice call, he decides to decline any further calls by signalling a user busy condition. The details of such signalling have already been described under the MO call establishment procedure, FIG. 3A.

In steps 436 to 438, the MSC again compares the number of current data calls ($N_D=1$) with the maximum number of current data calls ($NMAX_D=5$) and allows the call by sending a CONNECT message to the MS. It also increments the number of current data calls $N_D$ to 2. In step 440, the MS sends a CONNECT_ACK message with a cause code "user busy". In step 442, the MSC detects the UDUB condition and sets an NDUB condition.

In step 444, another subscriber tries to place an MT data call to the MS. Although the number of current data calls ($N_D=0$) is lower than the maximum number of data calls ($NMAX_D=1$) there is no need for the MSC to perform this comparison, because of the NDUB condition. In step 446, the MSC rejects the MT data call by sending a RELEASE message to the calling party.

In step 448, another subscriber tries to place an MT fax call to the MS. In steps 450 to 452, the MSC compares the number of current fax calls ($N_F=0$) with the maximum number of current data calls ($NMAX_F=1$) and allows the call by sending a CONNECT message to the calling party. It also increments the number of current fax calls $N_F$ to 1. Thus, according to a preferred embodiment of the invention, the user can activate the UDUB condition individually for each call type. In this example, the MS is busy (because of UDUB) for data calls but available for a fax call.

Next, the MS user ends the latter data call. The user also wishes to cancel the UDUB condition for data calls. In step 454, the MS sends a DISCONNECT message with a facility information element "cancel busy". In response to the DISCONNECT message, in steps 456 to 458, the MSC sends a RELEASE message to the PSTN, decrements the number $N_D$ of simultaneous data calls, and cancels the NDUB condition for this MS.

Figure 5:
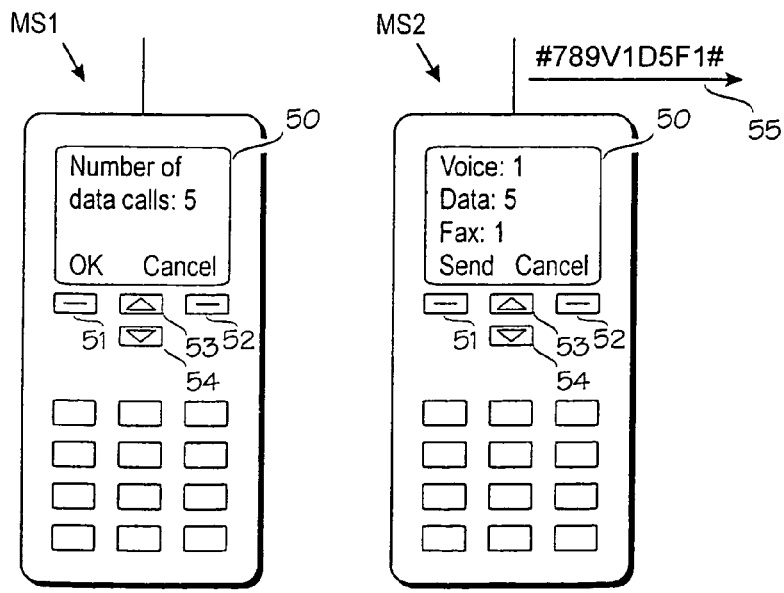
FIG. 5 illustrates a subscriber terminal having a specially adapted user interface for setting the upper limit for the number of simultaneous calls.

FIG. 5 illustrates a subscriber terminal, such as a mobile station, having a user interface for setting certain configuration parameters. In this example, the user interface comprises a display 50, software-programmable option keys 51 and 52, and up/down keys 53 and 54. Such a user interface is known from e.g. a Nokia 2110 GSM terminal. According to yet another aspect of the invention, the configuration parameters of the user interface comprise, for the number of said simultaneous calls, at least one second upper limit (NMAX), which is not lower than zero, and the subscriber terminal is adapted to transmit said at least one second upper limit (NMAX) to the telecommunications network.

Reference MS1 denotes a mobile station the user of which is defining the upper limit for the number of simultaneous data calls ($NMAX_D$). The user can change the limit by using the up/down keys 53 and 54 and accept the choice with the programmable OK key 51. Reference MS2 denotes a mobile station when the user has finished defining the limits as shown in the display 50. In this phase, the programmable key 51 means "Send". When the user presses this key, the mobile station sends to the network a message 55 comprising the user's upper limits for the number of simultaneous data calls. In this example, the message 55 is shown as a USSD message, such as #789V1D5F1#, where the # characters delimit the USSD message, 789 is the code for this configuration, and V1, D5 and F1 specify the upper limits for voice, data and fax calls, respectively.

The description only illustrates specific embodiments of the invention. The invention has been described in connection with third generation mobile communications systems, but the invention is also applicable in wired networks, wherein the transmission path to the subscriber terminal is a high-speed connection, such as an ADSL (Asymmetric Digital Subscriber Line) connection. Thus, the invention is not limited to these examples or the terms used, but it may vary within the scope of the appended claims.

REFERENCES

1. UMTS System Requirements 01.03
2. General UMTS architecture 23.01
3. Network principles 23.05
4. UMTS service aspect principles 22.01

All references are incorporated herein by reference.

What is claimed is:

1. A method for managing multiple, independent, simultaneous calls over a transmission path between a telecommunications network and a subscriber terminal, a set of subscriber data being associated with the subscriber terminal, the method comprising:
    allowing a new call only within a first upper limit, which is related to an available capacity of the transmission path;
    defining, for the simultaneous calls, at least one second upper limit, which is not lower than zero;
    monitoring an actual number of simultaneous calls between the network and the subscriber terminal; and
    allowing a new call to or from the subscriber terminal only if the actual number of simultaneous calls is less than at least one second upper limit.

2. The method of claim 1, wherein the at least one second upper limit is stored individually for a subscriber.

3. The method of claim 2, wherein the at least one second upper limit is stored with the set of subscriber data associated with the subscriber terminal.

4. The method of claim 1, wherein the simultaneous calls are classified into multiple call types, the call types include at least two of voice, data, telefax and video call types, and the defining at least one second upper limit, monitoring the actual number of simultaneous calls and allowing a new call to or from the subscriber terminal are performed separately for each call type.

5. The method of claim 1, further comprising providing a user of the subscriber terminal with means for setting the at least one second upper limit.

6. The method of claim 1, wherein the at least one second upper limit is defined so that the actual number of simultaneous calls allowed by using the at least one second upper limit does not result in exceeding the first upper limit.

7. The method of claim 6, wherein the first upper limit specifies a maximum data rate, there is a characteristic data rate for each call or call type, and the at least one second upper limit is defined so that the sum of the characteristic data rates of the simultaneous calls does not exceed the first upper limit.

8. The method of claim 1, further comprising detecting a network-determined user busy condition if the actual number of simultaneous calls is at least as high as the at least one second upper limit.

9. The method of claim 8, wherein the simultaneous calls are classified into multiple call types, the call types include at least two of voice, data, telefax and video call types, and detecting a network-determined user busy condition is performed for each call type.

10. The method of claim 8, further comprising detecting a network-determined user busy condition in response to a user-determined user busy condition.

11. The method of claim 1, wherein the telecommunications network is a cellular mobile network and the transmission path comprises a radio interface.

* * * * *